(12) United States Patent
Mackenzie (10) Patent No.: US 9,010,407 B2
(45) Date of Patent: Apr. 21, 2015

(54) WASTE WATER HEAT RECOVERY SYSTEM

(75) Inventor: Steven Mackenzie, West Blomfield, MI (US)

(73) Assignee: Mac-Dan Innovations LLC, West Bloomfield, MI (US)

( * ) Notice: Subject to any disclaimer, the term of this patent is extended or adjusted under 35 U.S.C. 154(b) by 682 days.

(21) Appl. No.: 12/752,812

(22) Filed: Apr. 1, 2010

(65) Prior Publication Data

US 2011/0240269 A1    Oct. 6, 2011

(51) Int. Cl.
| | | |
|---|---|---|
| F28D 7/10 | (2006.01) | |
| F28D 7/00 | (2006.01) | |
| E03C 1/00 | (2006.01) | |
| F28F 9/26 | (2006.01) | |
| F28F 13/00 | (2006.01) | |
| F28D 21/00 | (2006.01) | |

(52) U.S. Cl.
CPC ............... *F28D 7/0025* (2013.01); *E03C 1/00* (2013.01); *E03C 2001/005* (2013.01); *F28D 21/0012* (2013.01); *F28F 9/26* (2013.01); *F28F 13/00* (2013.01); *F28F 2275/08* (2013.01); *Y02B 30/566* (2013.01)

(58) Field of Classification Search
CPC ............. E03C 1/00; E03C 1/12; E03C 1/122; F28D 21/0012; F28D 7/02; F28D 7/022; F28D 7/024; F28D 7/026; F28D 7/0008; F28D 7/0016; F28D 7/0025; F28D 7/0033; F28F 13/00; F28F 13/14; F28F 9/26; Y02B 30/566
USPC .......... 165/141, 156, 164, 172, 11.1, 70, 169, 165/173, 901; 138/112, 116, 117, 38; 285/124.1–124.5, 419
See application file for complete search history.

(56) References Cited

U.S. PATENT DOCUMENTS

| | | | | |
|---|---|---|---|---|
| 1,841,762 | A * | 1/1932 | Samesreuther et al. | ....... 165/169 |
| 2,858,113 | A * | 10/1958 | Miller | .......... 165/11.1 |
| 3,799,257 | A * | 3/1974 | De Clercq | ....... 165/171 |
| 4,206,805 | A * | 6/1980 | Beckett | ........... 165/80.5 |
| 4,377,200 | A * | 3/1983 | Kochanowski | ........... 165/76 |
| 4,411,307 | A * | 10/1983 | Ecker | ............ 165/70 |
| 4,619,311 | A | 10/1986 | Vasile et al. | |
| 4,682,578 | A * | 7/1987 | Schmidt | ........ 126/91 R |
| 4,793,634 | A * | 12/1988 | Alloggiamento | ......... 283/2 |
| 5,725,047 | A * | 3/1998 | Lopez | ............ 165/149 |
| 5,799,727 | A * | 9/1998 | Liu | ............. 165/170 |

(Continued)

OTHER PUBLICATIONS

Friedman et al., "Liquid Films in the Viscous Flow Region", Industrial & Engineering Chemistry 1941, vol. 33 (7), 885-891.

*Primary Examiner* — Allen Flanigan
*Assistant Examiner* — Antonio R Febles
(74) *Attorney, Agent, or Firm* — Dickinson Wright PLLC (57) ABSTRACT

A waste water heat recovery system may include a waste water conduit, a plurality of heat exchanger modules, an inlet manifold, and an outlet manifold. The plurality of heat exchanger modules may be disposed on an outer surface of the waste water conduit. Each of the plurality of heat exchanger modules may include a first conduction member, a second conduction member, and a serpentine potable water conduit seated between the first and second conduction members. The inlet manifold may receive potable water from a water source and may be fluidly connected to an inlet of the potable water conduit of each of the plurality of heat exchanger modules. The outlet manifold may be fluidly connected to an outlet of the potable water conduit of each of the plurality of heat exchanger modules.

28 Claims, 7 Drawing Sheets

(56) References Cited

U.S. PATENT DOCUMENTS

| | | | |
|---|---|---|---|
| 5,899,077 A * | 5/1999 | Wright et al. | 62/3.7 |
| 5,940,939 A * | 8/1999 | Geppert | 24/20 R |
| 6,749,014 B2 * | 6/2004 | Ferraro | 165/156 |
| 6,772,829 B2 * | 8/2004 | Lebrun | 165/121 |
| 6,853,555 B2 | 2/2005 | Fichera et al. | |
| 7,216,696 B2 * | 5/2007 | Ferraro | 165/156 |
| 2001/0032716 A1 * | 10/2001 | Consilius | 165/80.5 |
| 2002/0162650 A1 * | 11/2002 | MacKelvie | 165/154 |
| 2005/0189094 A1 | 9/2005 | Van Decker et al. | |
| 2008/0035320 A1 * | 2/2008 | Manasek et al. | 165/168 |
| 2008/0047698 A1 | 2/2008 | Vasile | |
| 2008/0185924 A1 * | 8/2008 | Masoudipour et al. | 310/54 |
| 2009/0025399 A1 * | 1/2009 | Kamen et al. | 62/6 |
| 2010/0068123 A1 * | 3/2010 | Edwin et al. | 423/447.2 |
| 2010/0132403 A1 * | 6/2010 | MacKelvie | 62/515 |

* cited by examiner

_Fig-1_

_Fig-2_

WASTE WATER HEAT RECOVERY SYSTEM

FIELD

The present disclosure relates to a heat transfer system, and more particularly, to a system for transferring thermal energy from waste water.

BACKGROUND

This section provides background information related to the present disclosure which is not necessarily prior art.

Residential, commercial and industrial buildings include plumbing systems that provide clean water to the building's inhabitants or occupants and route waste water to a sewer system or other waste water depository. Building and health codes and regulations require such plumbing systems to fluidly isolate the clean water from the waste water to avoid contaminating the clean water and to ensure the clean water is potable. Therefore, waste water conduits and clean water conduits must also be fluidly isolated from each other.

Plumbing systems provide both hot and cold clean water to allow the building's occupants to control the temperature of the clean water. Therefore, plumbing systems often include a boiler or hot-water heater to heat a portion of the clean water entering the plumbing system from a local water source. Heating the water requires considerable energy consumption, which has significant economic and environmental consequences.

A substantial portion of thermal energy in hot water is lost when the water enters a drain as waste water. Accordingly, it is economically and environmentally advantageous to transfer as much of the thermal energy in waste water to the clean water before the clean water is heated in the hot-water heater. A heat recovery system may be employed to extract thermal energy from the waste water and use this thermal energy to preheat the clean water before it enters the boiler or hot-water heater.

SUMMARY

This section provides a general summary of the disclosure, and is not a comprehensive disclosure of its full scope or all of its features.

In one form, the present disclosure provides a heat exchanger that may include a first conduit, a second conduit, and a conduction member. The first conduit may include an inner surface and an outer surface. The second conduit may be disposed around at least a portion of the outer surface. The first conduction member may be disposed between the first conduit and the second conduit.

In another form, the present disclosure provides a waste water heat transfer system that may include a waste water conduit, a plurality of heat exchanger modules, an inlet manifold, and an outlet manifold. The plurality of heat exchanger modules may be disposed on an outer surface of the waste water conduit. Each of the plurality of heat exchanger modules may include a first conduction member, a second conduction member, and a serpentine potable water conduit seated between the first and second conduction members. The inlet manifold may receive potable water from a water source and may be fluidly connected to an inlet of the potable water conduit of each of the plurality of heat exchanger modules. The outlet manifold may be fluidly connected to an outlet of the potable water conduit of each of the plurality of heat exchanger modules.

In yet another form, the present disclosure provides a thermal energy recovery system that may include a plurality of heat exchanger modules, an inlet manifold, and an outlet manifold. The plurality of heat exchanger modules may be adapted to be secured to an outer surface of a waste water conduit. Each of the plurality of heat exchanger modules may include a first conduction member, a second conduction member and a serpentine conduit disposed between the first and second conduction members. The inlet manifold may be fluidly connected to an inlet of the serpentine conduit of each of the plurality of heat exchanger modules. The outlet manifold may be fluidly connected to an outlet of the serpentine conduit of each of the plurality of heat exchanger modules. Fluid flowing through the waste water conduit convectively transfers heat to the waste water conduit which conducts heat to the first conduction member. The first conduction member conducts heat to the second conduction member. The first and second conduction members conduct heat to the serpentine conduit, which convectively transfers heat to fluid therein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element or feature as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figures 1, 2:
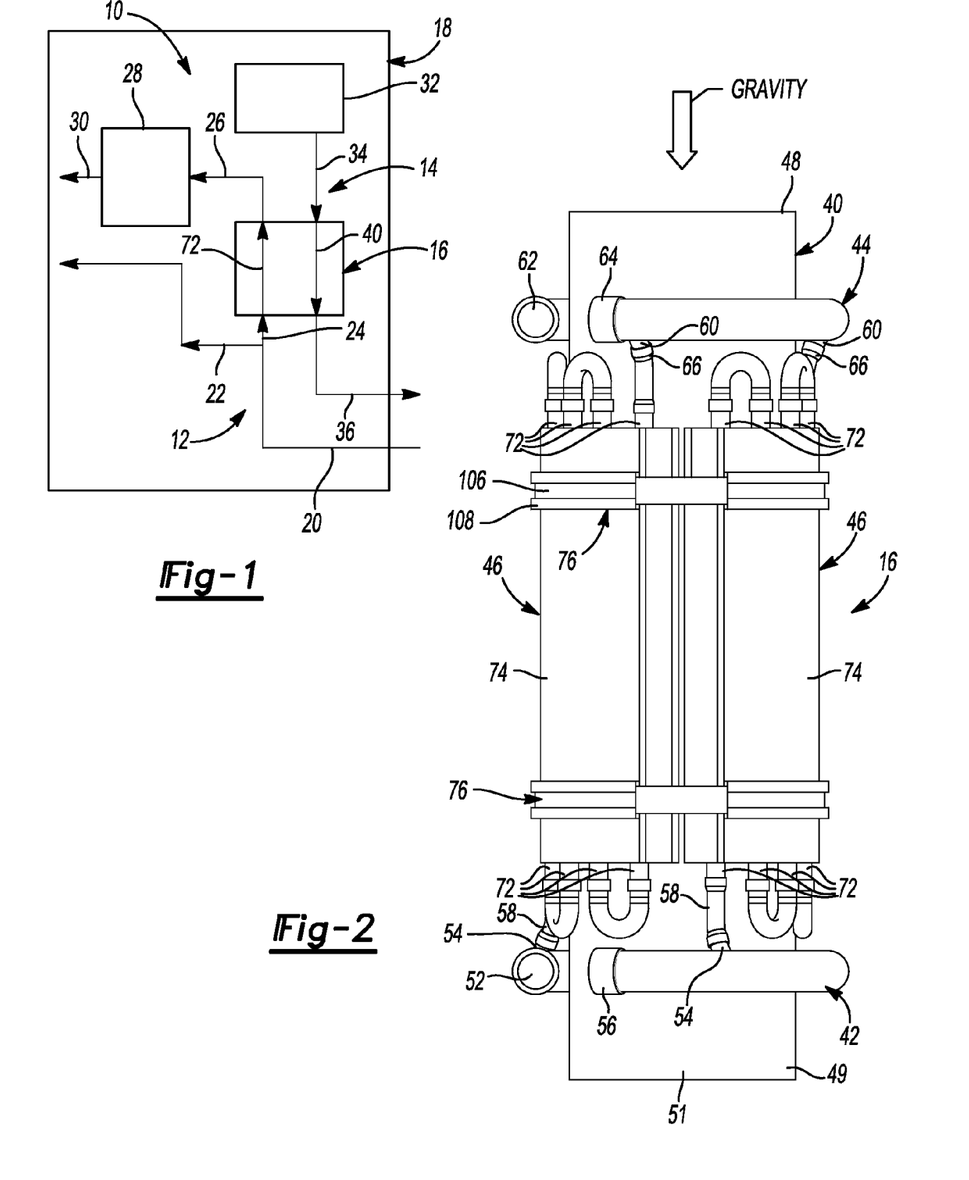
FIG. 1 is a schematic representation of a plumbing system having a waste water heat recovery system according to the principles of the present disclosure.
FIG. 2 is a side view of the waste water heat recovery system according to the principles of the present disclosure.
Figure 3:
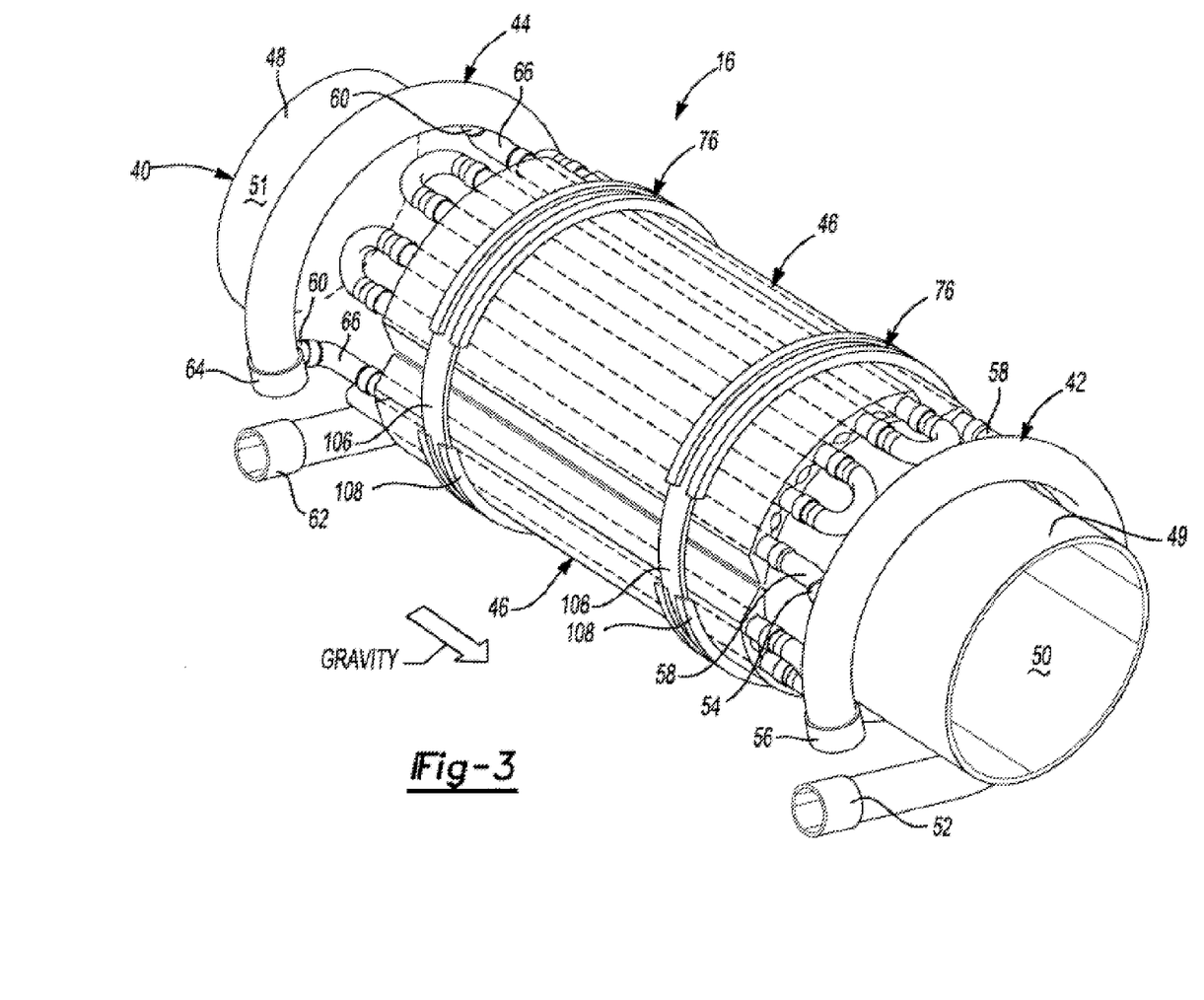
FIG. 3 is a perspective view of the waste water heat recovery system of FIG. 2.
Figure 4:
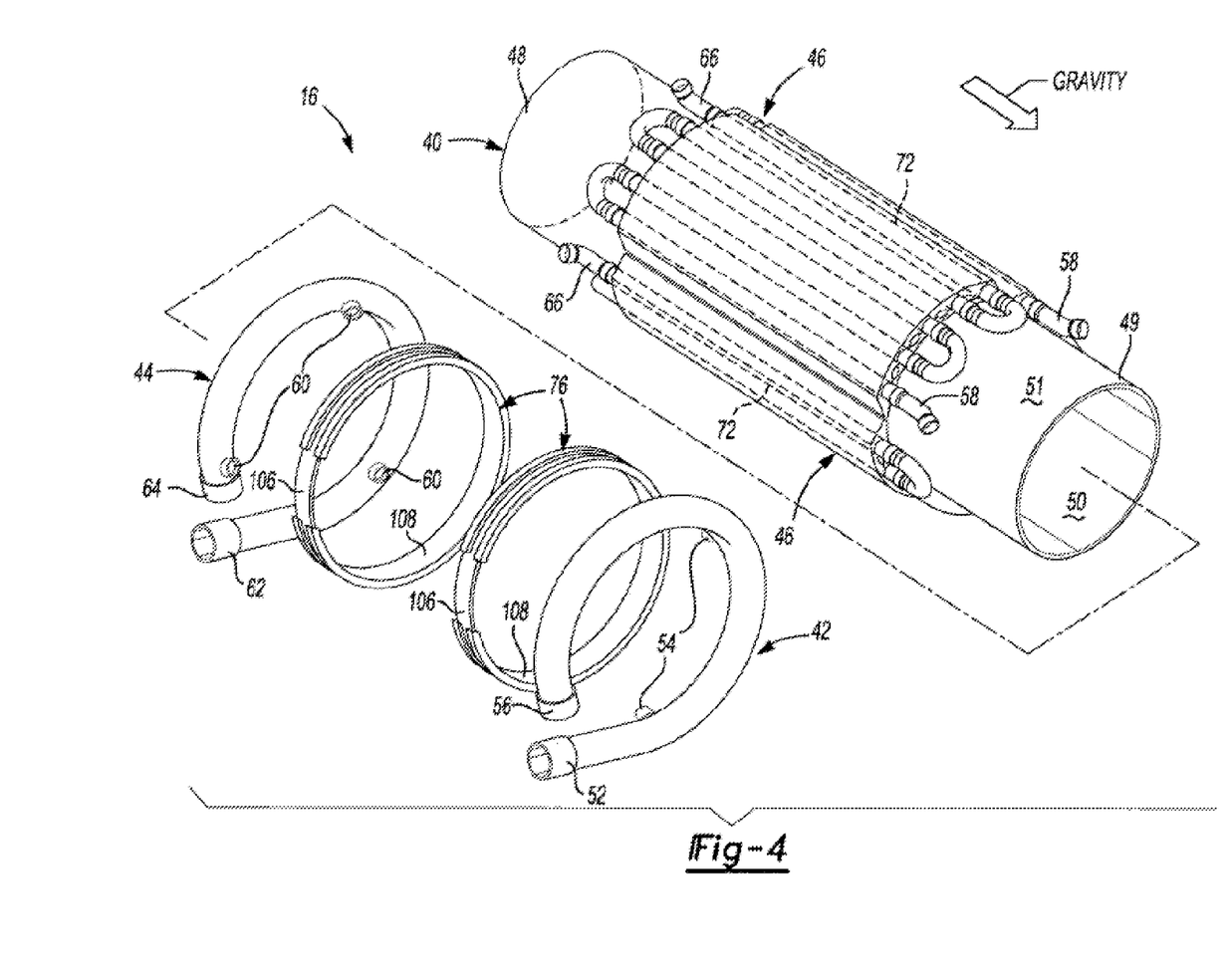
FIG. 4 is a partially exploded perspective view of the waste water heat recovery system of FIG. 2.

With reference to FIG. 1, a plumbing system 10 is provided and may include a water supply system 12, a waste water disposal system 14, and a waste water heat recovery system 16. The plumbing system 10 may be installed in a building 18, such as a residential, commercial, or industrial building, for example. In some embodiments, the water supply system 12 and the waste water disposal system 14 may be a part of a standard or preexisting plumbing system of the building 18. The water supply system 12 may provide potable water from a local water source to occupants or inhabitants of the building 18. The waste water disposal system 14 may route waste water to a sewer system or waste water management facility. As will be subsequently described, the waste water heat recovery system 16 transfers heat from waste fluid in the waste water disposal system 14 to potable water in the water supply system 12 without transferring contaminants from the waste fluid to the potable water.

The water supply system 12 may include a main supply conduit 20, a cold-water supply conduit 22, a first preheat conduit 24, a second preheat conduit 26, a boiler or hot-water heater 28, and a hot-water supply conduit 30. Potable water may enter the water supply system 12 via the main supply conduit 20 from a local public water source. A first portion of the water in the main supply conduit 20 enters the cold-water supply conduit 22 and second portion of the water in the main supply conduit 20 enters the first preheat conduit 24. Water in the first preheat conduit 24 is routed through the heat recovery system 16, where the water is preheated (as will be subsequently described) and directed to the second preheat conduit 26. From the second preheat conduit 26, the water is routed to the hot-water heater 28, where the water is heated further. From the hot-water heater 28, the water enters the hot-water supply conduit 30. The cold-water supply conduit 22 and the hot-water supply conduit 30 are fluidly connected to faucets, bath tubs, showers, dishwashers, laundry washing machines, and/or industrial or commercial equipment or machinery, for example.

The waste water disposal system 14 may include a drain 32, a first waste fluid conduit 34 and a second waste fluid conduit 36. The drain 32 may be fluidly coupled with one or more of the faucets, bath tubs, showers, dishwashers, laundry washing machines, and/or industrial or commercial equipment or machinery within the building 18 and allows waste water to enter the waste water disposal system 14. The first waste fluid conduit 34 is fluidly connected to the drain 32 and routes the waste fluid to the heat recovery system 16, where heat is transferred from the waste fluid to potable water in the water supply system 12. From the heat recovery system 16, the waste fluid enters the second waste fluid conduit 36 and may be routed out of the building 18 to the sewer or waste water management system.

Referring now to FIGS. 1-9, the heat recovery system 16 will be described in detail. The heat recovery system 16 is a heat transfer system transferring heat from waste fluid in the waste water disposal system 14 to the potable water in the water supply system 12 while keeping the potable water fluidly isolated from the waste fluid to prevent contamination. This transfer of heat preheats the potable water before it enters the hot-water heater 28, thereby reducing the amount of energy required to heat the potable water to a desired temperature for use within the building 18.

The heat recovery system 16 may include a waste pipe 40, an inlet manifold 42, an outlet manifold 44, and a plurality of heat exchanger modules 46. The waste pipe 40 may include a first end 48, a second end 49, an inner surface 50, and an outer surface 51. The first end 48 may be connected to the first waste fluid conduit 34 for fluid communication via an adaptor, compression fitting, slip nut, welding, soldering, brazing, and/or other standard pipe connection. The second end 49 may be connected to the second waste fluid conduit 36 for fluid communication via an adaptor, compression fitting, slip nut, welding, soldering, brazing, and/or other standard pipe connection. In this manner, the waste pipe 40 may be retrofitted to a preexisting waste water conduit in the building 18. However, in some embodiments, the first waste fluid conduit 34, the waste pipe 40, and the second waste fluid conduit 36 could be a single continuous conduit that may be installed during construction of the building 18 and/or installation of the plumbing system 10.

The waste pipe 40 may be a generally straight pipe formed from copper, aluminum, cast iron, steel, or any other thermally conductive material. In the particular embodiment illustrated in FIGS. 1-9, the waste pipe 40 is oriented vertically, such that fluid flowing therethrough flows in the direction of gravity. Arranging the waste pipe 40 in the vertical orientation may increase the flow rate of the fluid flowing therethrough, which increases the convective heat transfer between the fluid and the inner surface 50 of the waste pipe 40.

The inlet manifold 42 may extend around at least a portion of the periphery of the waste pipe 40 and may include an inlet 52, a plurality of outlets 54, and a capped end 56. The inlet 52 may be fluidly coupled with the first preheat conduit 24 of the water supply system 12 via an adaptor, compression fitting, slip nut, welding, soldering, brazing, for example, and/or other suitable means. Each of the plurality of outlets 54 may be fluidly connected to a corresponding one of the plurality of heat exchanger modules 46 via a fitting 58 or other suitable connection means.

The outlet manifold 44 may extend around at least a portion of the periphery of the waste pipe 40 and may include a plurality of inlets 60, an outlet 62, and a capped end 64. Each of the plurality of inlets 60 may be fluidly connected to a corresponding one of the plurality of heat exchanger modules 46 via a fitting 66 or other suitable connection means. The outlet 62 may be fluidly coupled with the second preheat conduit 26 of the water supply system 12 via an adaptor, compression fitting, slip nut, welding, soldering, brazing, and/or other suitable means.

Each of the plurality of heat exchanger modules 46 may include a serpentine pipe 72, a thermally conductive shield 74, and one or more clamps 76. In the particular embodiment illustrated in FIGS. 2-9, the heat recovery system 16 includes three heat exchanger modules 46 extending around the entire circumference of the waste pipe 40. However, it will be appreciated that the heat recovery system 16 could include any number of heat exchanger modules 46. While not shown in the figures, an insulation material may be disposed around the heat exchanger modules 46 to reduce heat loss to the ambient air.

Figures 5, 6:
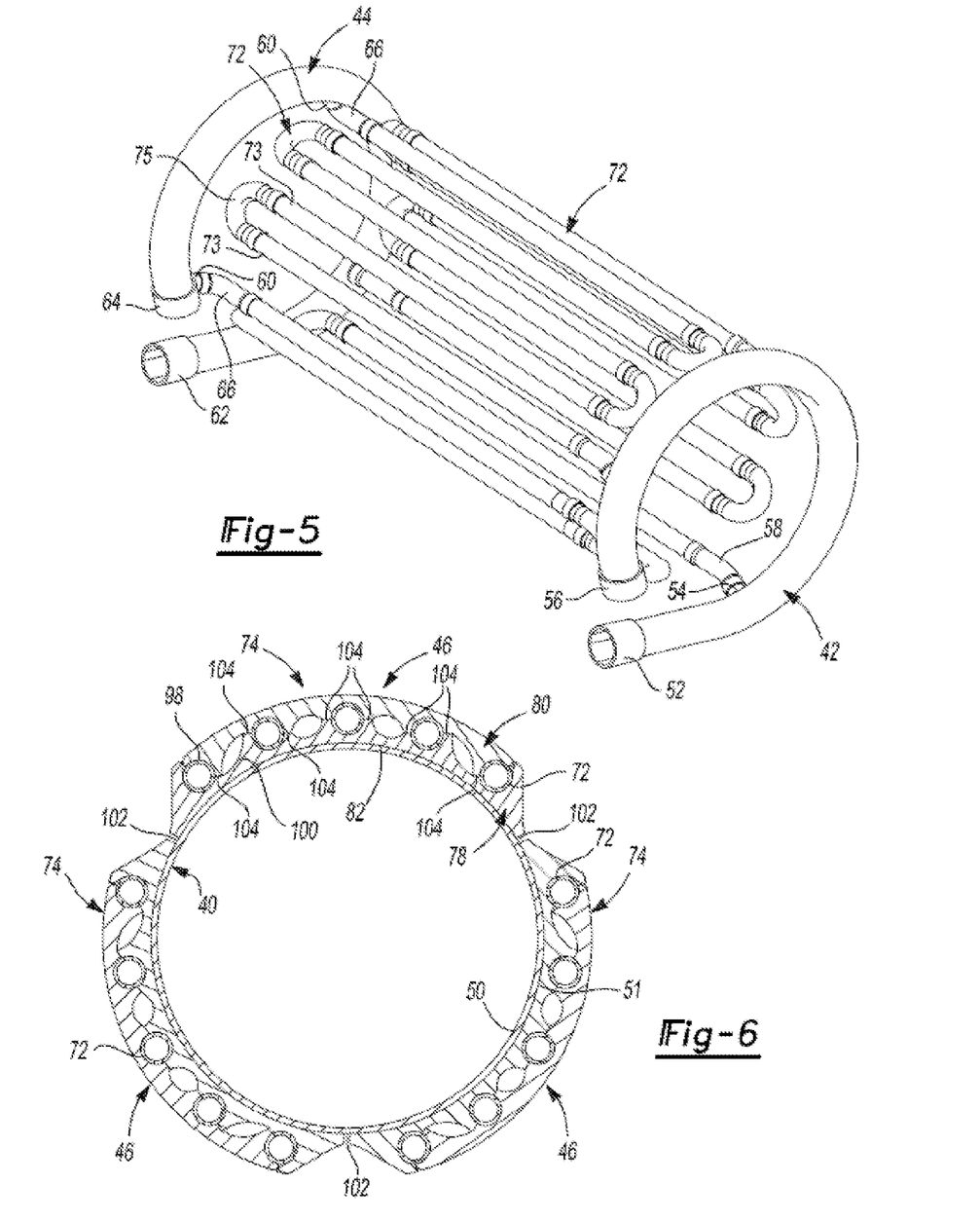
FIG. 5 is a perspective view of potable water conduits of the waste water heat recovery system connected to inlet and outlet manifolds according to the principles of the present disclosure.
FIG. 6 is a cross-sectional view of the waste water heat recovery system according to the principles of the present disclosure.

The serpentine pipes 72 could be formed from copper, aluminum, steel, or cast iron, for example, and may include an inner diameter having a smooth inner surface or an enhanced surface geometry, such as helical or straight grooves, for example. Such enhanced surface geometry may increase the surface area of the inner surface of the serpentine pipes 72 and may restrict fluid flow therethrough, which affects the heat transfer characteristics between the fluid and the serpentine pipes 72. While FIG. 5 illustrates each serpentine pipe 72 having a plurality of straight pipe segments 73 fluidly connected to each other via U-shaped joints 75, in some embodiments, the straight pipe segments 73 may be integrally formed with the U-shaped joints 75 as a continuous conduit. In some embodiments, one or more of the straight pipe segments 73 of the serpentine pipe 72 may include the enhanced surface geometry and another one or more of the straight pipe segments 73 may be smooth. In this manner, flow restriction and heat transfer capacity may be customized for a particular plumbing system or application.

The thermally conductive shield 74 may include an inner conductive member 78 and an outer conductive member 80 formed from aluminum, copper, steel, or cast iron, for example. The inner conductive member 78 may include an inner surface 82 and an outer surface 84. The outer conductive member 80 may include an inner surface 86 and an outer surface 88.

Figure 8:
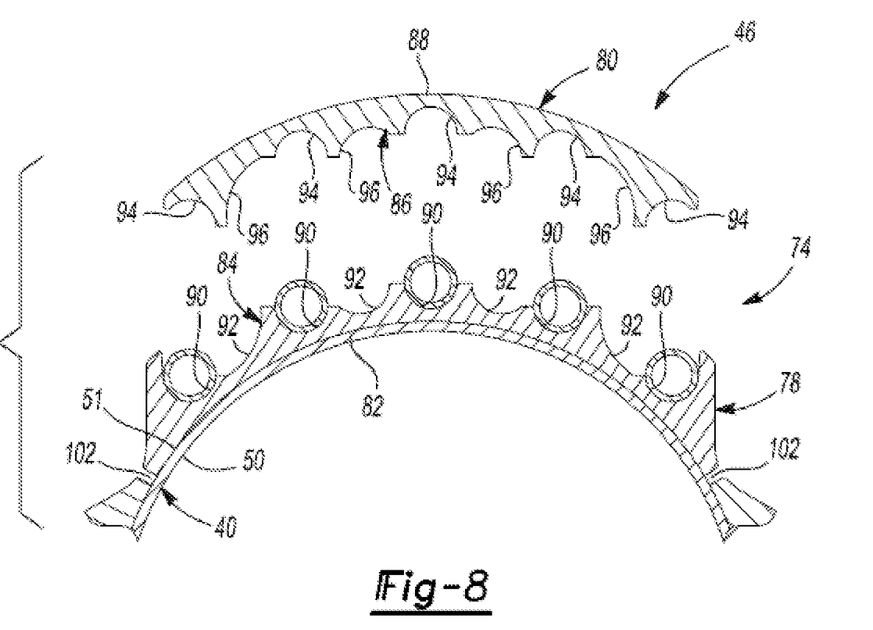
FIG. 8 is a partially exploded partial cross-sectional view of the waste water heat recovery system according to the principles of the present disclosure.
Figure 9:
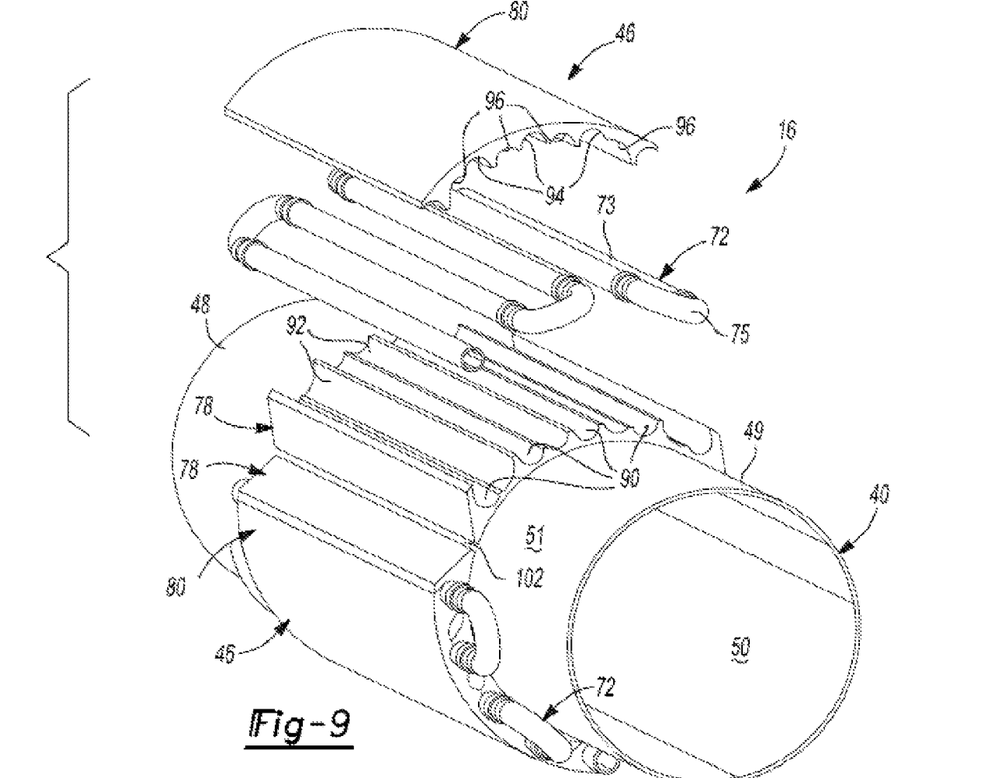
FIG. 9 is a partially exploded partial perspective view of the waste water heat recovery system according to the principles of the present disclosure.

The inner surface 82 of the inner conductive member 78 is disposed on the outer surface 51 of the waste pipe 40 and may have a radius substantially equal to a radius of the outer surface 51 of the waste pipe 40 to maximize the contact area therebetween and increase the conductive heat transfer therebetween. The outer surface 84 of the inner conductive member 78 includes a first plurality of grooves 90 and a second plurality of grooves 92 (FIG. 8). The inner surface 86 of the outer conductive member 80 may include a first plurality of grooves 94 and a second plurality of grooves 96.

The first plurality of grooves 94 of the outer conductive member 80 are aligned with the first plurality of grooves 90 of the inner conductive member 78 and cooperate with each other to form encapsulation channels 98 that at least partially encapsulate the serpentine pipe 72. The diameters of the encapsulation channels 98 may be sized relative to the serpentine pipe 72 to maximize contact area between the serpentine pipe 72 and the inner and outer conductive members 78, 80.

The second plurality of grooves 96 of the outer conductive member 80 are aligned with the second plurality of grooves 92 of the inner conductive member 78 and cooperate with each other to form potable water vents 100. Each of the potable water vents 100 is disposed between adjacent encapsulation channels 98 (shown in FIG. 7). The thermally conductive shields 74 of adjacent heat exchanger modules 46 may be circumferentially spaced apart from each other to form waste water vents 102 therebetween (shown best in FIG. 6). Such a configuration provides venting for potable water that is independent from and isolated from the venting for the waste water. The vents 100, 102 allow for a visual indicator of any leaks in the potable water flow path or the waste water flow path. The isolation between the waste water vents 102 and the flow path of the potable water reduces the risk of contamination of the potable water from a leak in the waste pipe 40 and/or the serpentine pipe 72.

Figure 7:
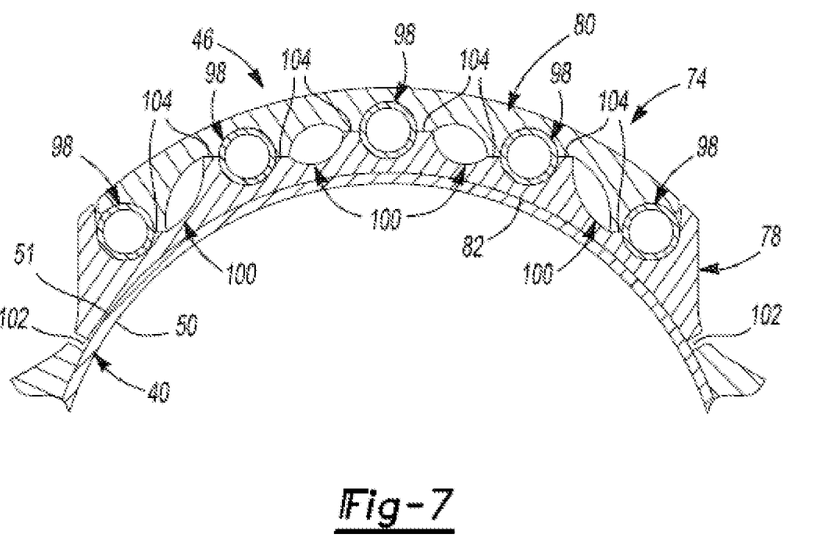
FIG. 7 is a partial cross-sectional view of the waste water heat recovery system according to the principles of the present disclosure.

As shown best in FIGS. 6 and 7, the inner and outer conductive members 78, 80 contact each other at a plurality of contact surfaces 104. The contact surfaces 104 (FIG. 7) facilitate conductive heat transfer between the inner conductive member 78 and the outer conductive member 80.

The clamps 76 may include a metallic or polymeric band clamp 106 and one or more rubber extrusions 108. The clamps 76 may be fastened around the thermally conductive shields 74 to secure the heat exchanger modules 46 to the waste pipe 40. The rubber extrusions 108 may be disposed between the band clamps 106 and the thermally conductive shields 74 to prevent the clamp 76 from slipping and to dampen vibration between the band clamps 106 and the thermally conductive shields 74. Securing the heat exchanger modules 46 to the waste pipe with the clamps 76 eliminates the need to weld the heat exchanger directly to the waste pipe 40, thereby preserving the structural integrity of the waste pipe 40, further reducing the risk of leaks.

Referring now to FIGS. 1-9, operation of the heat recovery system 16 will be described in detail. As described above, hot waste fluid from a faucet, shower, bathtub, dishwasher, laundry washing machine, or other fixture, machine or equipment is expelled down the drain 32. From the drain 32, the hot waste fluid flows through the first waste fluid conduit 34 and into the first end 48 of the waste pipe 40. Since the waste pipe 40 is arranged in a vertical orientation, the waste fluid falling due to gravity therethrough creates a falling film effect, i.e., the falling fluid tends to cling to the inner surface 50 and wet the inner surface 50 around substantially its entire diameter. The fluid flowing through the waste pipe 40 convectively transfers heat to the inner surface 50 of the waste pipe 40.

As heat convectively transferred to the inner surface 50 of the waste pipe 40 conducts through the wall thickness of the waste pipe 40, heat will be conducted from the outer surface 51 of the waste pipe 40 to the inner conductive member 78 of each heat exchanger module 46. The heat will continue to be conducted through the thickness of the inner conductive member 78 to the grooves 90 in the outer surface 84 of the inner conductive member 78. Heat will conduct from the inner conductive member 78 to the outer conductive member 80 via the contact surfaces 104. From the contact surfaces 104, heat will be conducted through the outer conductive member 80 to the grooves 94. Heat from the grooves 90, 94 of the inner and outer conductive members 78, 80, respectively, will be conducted to the serpentine pipes 72 encapsulated between the inner and outer conductive members 78, 80.

As described above, potable water flows from the first preheat conduit 24 into the inlet manifold 42 of the heat recovery system 16. From the inlet manifold 42, water is distributed into the serpentine pipes 72 of each heat exchanger module 46 via the corresponding fittings 58. The water flows through the serpentine pipes 72 in back and forth longitudinal directions relative to the waste pipe 40. Heat is convectively transferred from the walls of the serpentine pipes 72 to the potable water therein. In this manner, when the potable water enters the outlet manifold 44 and is directed to the hot-water heater 28 via the second preheat conduit 26, the potable water is at a higher temperature than it was before entering the heat recovery system 16. In this manner, the potable water is preheated before entering the hot-water heater 28 while keeping the potable water fluidly isolated via three layers of separation from the waste water.

Figure 10:
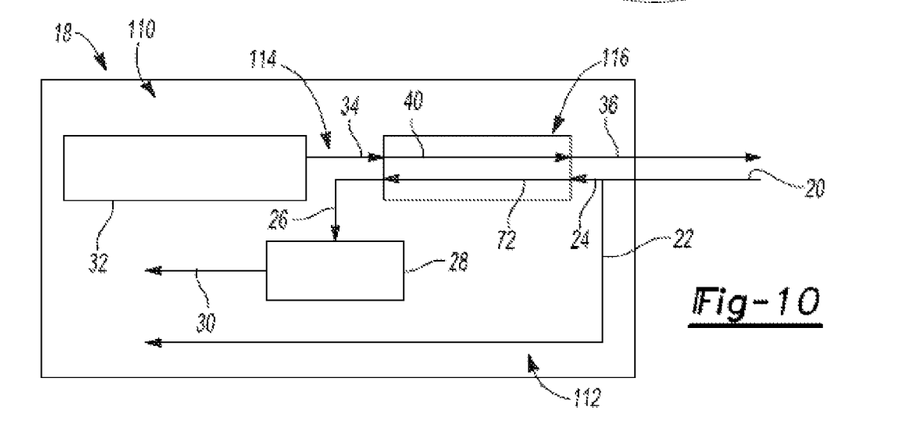
FIG. 10 is a schematic representation of another embodiment of a plumbing system having a waste water heat recovery system according to the principles of the present disclosure.
Figure 11:
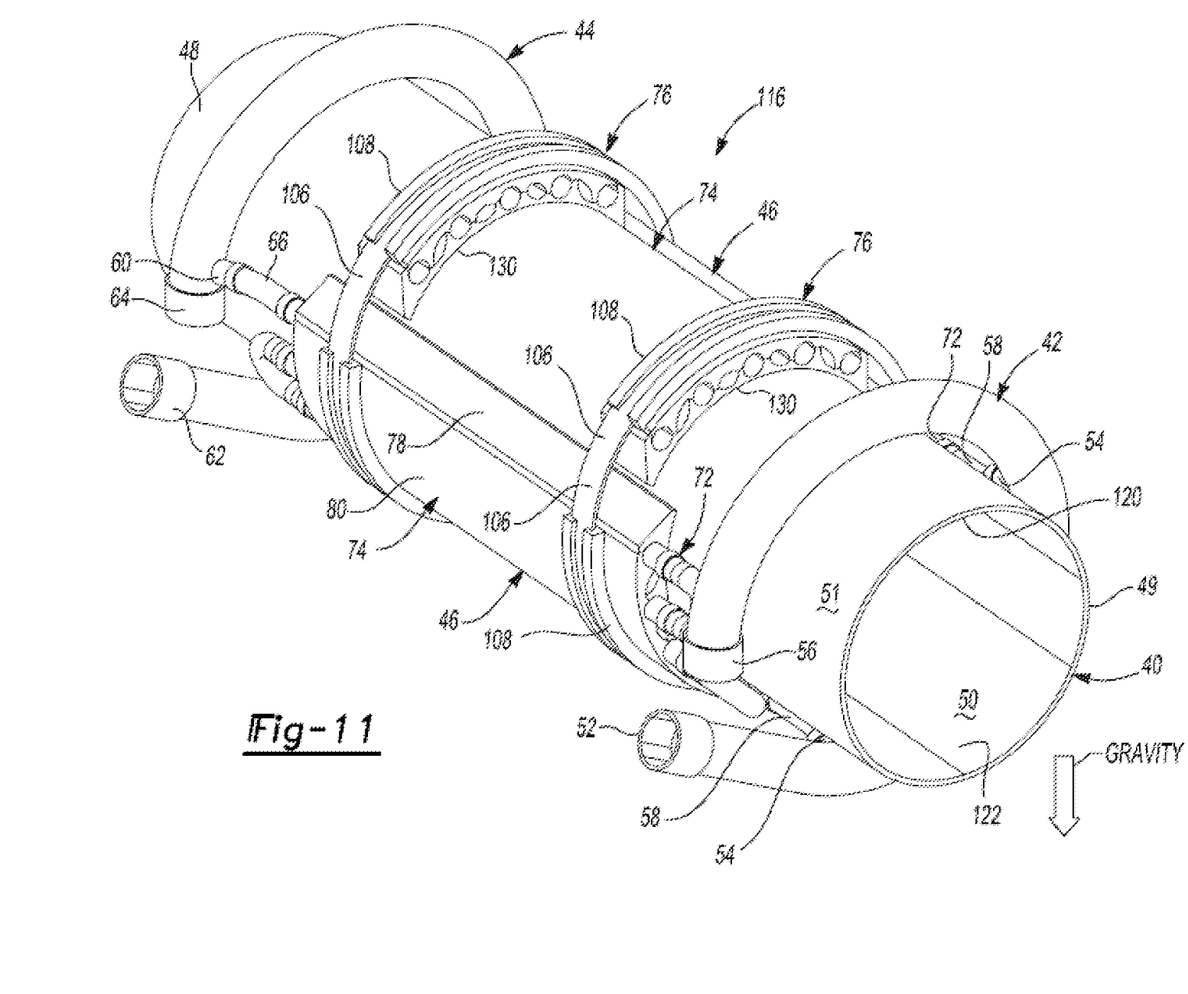
FIG. 11 is a perspective view of the waste water heat recovery system of FIG. 10.

Referring now to FIGS. 10 and 11, another embodiment of the plumbing system 110 is provided and may include a water supply system 112, a waste water disposal system 114, and a waste water heat recovery system 116. The structure of the water supply system 112 and waste water disposal system 114 are substantially similar to the water supply system 12 and waste water disposal system 14 described above, and therefore, will not be described again in detail. However, it should be noted that the waste water disposal system 114, and hence the waste water heat recovery system 116, are oriented generally horizontally relative to the direction of gravity.

The heat recovery system 116 may include the waste pipe 40, the inlet manifold 42, the outlet manifold 44, and one or more of the heat exchanger modules 46, all of which may include substantially similar structure as the waste pipe 40, inlet manifold 42, the outlet manifold 44 and heat exchanger modules 46 of the heat recovery system 16 described above. However, the waste pipe 40 of the heat recovery system 116 is oriented generally horizontally relative to the direction of gravity to correspond with the horizontal orientation of the first and second waste fluid conduits 34, 36 of the waste water disposal system 114.

In the horizontal orientation, gravity may prevent waste fluid flowing through the waste pipe 40 from wetting an upper portion 120 (FIG. 11) of the inner surface 50 of the waste pipe 40. Instead, gravity may force all or a substantial portion of the waste fluid downward within the waste pipe 40, such that the waste fluid remains in contact only with a lower portion 122 (FIG. 11) of the inner surface 50 of the waste pipe 40.

Because waste fluid may not wet the upper portion 120 of the inner surface 50 of the waste pipe 40 in the horizontal orientation, the amount of heat transferred from the waste fluid to the upper portion 120 may be significantly reduced relative to the vertical orientation described above. Therefore, placing one of the heat exchanger modules 46 on a portion of the outer surface 51 of the waste pipe 40 that corresponds to the upper portion 120 may reduce the overall heat transfer efficiency of the heat recovery system 116.

As shown in FIG. 11, the heat recovery system 116 may include one or more heat exchanger modules 46 circumferentially spanning around a portion of the circumference of the waste pipe 40. In the particular embodiment illustrated in FIG. 11, the heat recovery system 116 includes two heat exchanger modules 46 that cooperate to span approximately two-hundred-forty degrees. The remaining one-hundred-twenty degrees of the circumference of the waste pipe 40 may correspond to the upper portion 120 of the waste pipe 40 that is not wetted by the waste fluid.

A portion of the outer surface 51 of the waste pipe 40 corresponding to the upper portion 120 may include shims 130 to support the clamps 76. The shims 130 may include a thickness that is substantially equal to the thickness of the thermally conductive shields 74 of the heat exchanger modules 46. In the particular embodiment shown in FIG. 11, the shims 130 are formed from segments of inner and outer conductive members 78, 80 of a thermally conductive shield 74. Alternatively, the shims 130 shown in FIG. 11 could be replaced with an entire thermally conductive shield 74 to provide support for the clamps 76. Either of the above options may reduce the manufacturing cost and complexity of the heat recovery system 116. However, it will be appreciated that the shims 130 could be formed in any other suitable manner.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A heat exchanger comprising:
a first conduit having an outer surface;
an inner conduction member disposed around at least a portion of the outer surface of the first conduit;
an outer conduction member disposed radially outward relative to and in abutting relationship with the inner conduction member;
the inner conduction member including a plurality of first inner member grooves;
the outer conduction member including a plurality of first outer member grooves disposed in aligned relationship with the first plurality of inner member grooves when the inner and outer conduction members are disposed in abutting relationship with one another to define an encapsulation channel between each of the aligned first inner member grooves and first outer member grooves;
a second conduit extending through each of the encapsulation channels to dispose the second conduit in spaced and non-contacting relationship with the first conduit;
the inner conduction member including a plurality of second inner member grooves, with each one of the second inner member grooves disposed between adjacent first inner member grooves; and
the outer conduction member including a plurality of second outer member grooves, with each one of the second outer member grooves disposed between adjacent first outer member grooves and in aligned relationship with one of the second inner member grooves of the inner conduction member when the inner and outer conduction members are disposed in abutting relationship with one another to define fluid vents extending between each of the aligned second inner member grooves and second outer member grooves.

2. The heat exchanger of claim 1, wherein the second conduit extends longitudinally relative to the first conduit and circumferentially around at least the portion of the outer surface of the first conduit.

3. The heat exchanger of claim 1, wherein the second conduit includes a serpentine flow path defined by a plurality of linearly extending segments fluidly coupled to each other via a plurality of U-shaped joints.

4. The he exchanger of claim 1, wherein the inner and outer conduction members are disposed in abutting relationship to one another along a plurality of contact surfaces to facilitate conductive-heat transfer from the inner conduction member to the outer conduction member.

5. The heat exchanger of claim 1, further comprising a band clamp extending circumferentially around the outer conduction member to collectively secure the outer conductive member and the inner conductive member and the second conduit to the first conduit.

6. The heat exchanger of claim 1, wherein the first conduit receives waste fluid from a drain and the second conduit receives water from a potable water source.

7. The heat exchanger of claim 1 wherein the fluid vents are longitudinally extending substantially parallel to the second conduit.

8. The heat exchanger of claim 1 wherein the second conduit does not pass through the fluid vents.

9. A waste water heat transfer system comprising:
a waste water conduit having an outer surface;
a plurality of heat exchanger modules disposed on the outer surface of the waste water conduit, each of the plurality of heat exchanger modules including an inner conduction member having a plurality of first inner grooves, an outer conduction member disposed in abutting relationship with the inner conduction member and having a plurality of first outer grooves and a serpentine potable water conduit seated between the inner and outer conduction members and situated at least partially in both of the plurality of first inner grooves and the plurality of first outer grooves to prevent direct contact between the potable water conduit and the waste water conduit;
an inlet manifold receiving potable water from a water source and fluidly connected to an inlet of the potable water conduit of each of the plurality of heat exchanger modules;
an outlet manifold fluidly connected to an outlet of the potable water conduit of each of the plurality of heat exchanger modules;
each of the inner conduction members including a plurality of second inner member grooves, with each one of the second inner member grooves disposed between adjacent first inner member grooves; and
each of the outer conduction members including a plurality of second outer member grooves, with each one of the second outer member grooves disposed between adjacent first outer member grooves and in aligned relationship with one of the second inner member grooves of the inner conduction member when the inner and outer conduction members are disposed in abutting relationship with one another to define potable water vents extending between each of the aligned second inner member grooves and second outer member grooves.

10. The waste water heat transfer system of claim 9, wherein the inner conduction member is disposed on the outer surface of the waste water conduit and conducts heat from the waste water conduit to the potable water conduit.

11. The waste water heat transfer system of claim 9, wherein each of the inner conduction members are disposed in spaced relationship to adjacent inner conduction members to define a waste water vent extending therebetween.

12. The waste water heat transfer system of claim 9, wherein the waste water conduit is arranged in a vertical orientation such that fluid flows therethrough in the direction of gravity.

13. The waste water heat transfer system of claim 12, wherein the plurality of heat exchanger modules are circumferentially arrayed 360 degrees around an outer surface of the waste water conduit.

14. The waste water heat transfer system of claim 9, wherein the waste water conduit is arranged in a horizontal orientation.

15. The waste water heat transfer system of claim 14, wherein the plurality of heat exchanger modules are circumferentially arrayed 240 degrees around an outer surface of the waste water conduit.

16. The waste water heat transfer system of claim 9, further comprising a band clamp extending circumferentially around the plurality of heat exchanger modules to secure the plurality of heat exchanger modules to the waste water conduit.

17. The waste water heat transfer system of claim 16, wherein a polymeric member is disposed between the band clamp and the plurality of heat exchanger modules.

18. The waste water heat transfer system of claim 9, wherein the inner and outer conduction members are disposed in abutting relationship to one another along conduction surfaces disposed adjacent to the potable water conduits.

19. The waste water heat transfer system of claim 9, wherein the potable water conduit includes a plurality of straight pipes extending parallel to a longitudinal axis of the waste water conduit, and the straight pipes corresponding to each heat exchanger module are fluidly connected to each other.

20. The waste water heat transfer system of claim 9, wherein the inner and outer conduction members are formed from aluminum.

21. The heat exchanger of claim 9 wherein the potable fluid vents are longitudinally extending substantially parallel to the serpentine potable water conduit, and wherein the second conduit does not pass through the potable fluid vents.

22. A thermal energy recovery system comprising:
a plurality of heat exchanger modules adapted to be secured to an outer surface of a waste water conduit, each of the plurality of heat exchanger modules including an inner conduction member having a plurality of first inner grooves, an outer conduction member disposed in abutting relationship with the inner conduction member and having a plurality of first outer grooves and a serpentine conduit disposed between the inner and outer conduction members and situated at least partially in both the plurality of first inner grooves and the plurality of first outer grooves to prevent direct contact between the serpentine conduit and the waste water conduit;

an inlet manifold fluidly connected to an inlet of the serpentine conduit of each of the plurality of heat exchanger modules;

an outlet manifold fluidly connected to an outlet of the serpentine conduit of each of the plurality of heat exchanger modules;

each of the inner conduction members including a plurality of second inner member grooves, with each one of the second inner member grooves disposed between adjacent first inner member grooves; and each of the outer conduction members including a plurality of second outer member grooves, with each one of the second outer member grooves disposed between adjacent first outer member grooves and in aligned relationship with one of the second inner member grooves of the inner conduction member when the inner and outer conduction members are disposed in abutting relationship with one another to define first fluid vents extending between each of the aligned second inner member grooves and second outer member grooves.

23. The thermal energy recovery system of claim 22, wherein the inner and outer conduction members at least partially encapsulate the serpentine conduit.

24. The thermal energy recovery system of claim 22, wherein each of the heat exchanger modules are disposed in spaced relationship to adjacent heat exchanger modules to at least partially define second fluid vents extending therebetween.

25. The thermal energy recovery system of claim 24, wherein the first and second fluid vents are fluidly isolated from each other.

26. The thermal energy recovery system of claim 22, wherein the serpentine conduit is fluidly isolated from the waste water conduit by at least three layers of separation.

27. The thermal energy recovery system of claim 22, wherein the plurality or heat exchanger modules are adapted to be retrofitted to a preexisting waste water conduit.

28. The heat exchanger of claim 22 wherein the fluid vents are longitudinally extending substantially parallel to the second conduit, and wherein the second conduit does not pass through the fluid vents.

* * * * *